US008175819B2

(12) United States Patent
Fujisawa (10) Patent No.: US 8,175,819 B2
(45) Date of Patent: May 8, 2012

(54) TIRE INSPECTION DEVICE

(75) Inventor: Yoshitaka Fujisawa, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 470 days.

(21) Appl. No.: 12/304,380

(22) PCT Filed: Jun. 13, 2007

(86) PCT No.: PCT/JP2007/061899
§ 371 (c)(1),
(2), (4) Date: Dec. 11, 2008

(87) PCT Pub. No.: WO2007/145245
PCT Pub. Date: Dec. 21, 2007

(65) Prior Publication Data
US 2009/0281738 A1 Nov. 12, 2009

(30) Foreign Application Priority Data
Jun. 14, 2006 (JP) .................................. 2006-165095

(51) Int. Cl.
*G01B 5/28* (2006.01)
*G01B 5/30* (2006.01)
(52) U.S. Cl. .......................................... 702/35; 702/66
(58) Field of Classification Search .............. 702/32–36, 702/66–67, 70, 75–77, 79, 81, 113–115
See application file for complete search history.

(56) References Cited

U.S. PATENT DOCUMENTS

| 6,542,836 B1 * | 4/2003 | Sasaki et al. ............... 702/66 |
| 8,061,191 B2 * | 11/2011 | Hanatsuka ..................... 73/146 |
| 2002/0189336 A1 | 12/2002 | McEwan |
| 2003/0188573 A1 * | 10/2003 | Weiss ............................... 73/146 |
| 2008/0147347 A1 * | 6/2008 | Shaw et al. ................... 702/108 |

FOREIGN PATENT DOCUMENTS

| JP | A-08-329046 | 12/1996 |
| JP | A-10-160453 | 6/1998 |
| JP | A-2000-046893 | 2/2000 |
| JP | A-2001-016588 | 1/2001 |
| JP | A-2003-264704 | 9/2003 |

OTHER PUBLICATIONS

Goto Takahiro, Method and Device for Judging External Shape of Tire, Jun. 19, 1998, JP10160453 (machine translation attached).*
Ross L. Finney and George B. Thomas, Jr., Calculus, 1990, Addison-Wesley Publishing Company, ISBN 0-201-55701-0, pp. A-15.*
Extended European Search Report dated Jan. 11, 2012 for European Application No. 07745166.4.

* cited by examiner

*Primary Examiner* — Eliseo Ramos Feliciano
*Assistant Examiner* — Yaritza H Perez Bermudez
(74) *Attorney, Agent, or Firm* — Oliff & Berridge, PLC (57) ABSTRACT

A tire inspection device generates an analyzing wavelet for wavelet transformation correlating time, corresponding to tire surface position, and frequency, based on a frequency representing a characteristic portion of a predetermined tire surface structure. After this, the tire inspection device generates and stores an integer numeric filter from the created analyzing wavelet, detects the tire surface structure, carries out wavelet transformation on a signal obtained by the detection by using the numeric filter as the analyzing wavelet, and outputs the transformation result as the characteristic information representing the characteristic portion.

12 Claims, 10 Drawing Sheets

TIRE INSPECTION DEVICE

TECHNICAL FIELD

The present invention relates to a tire inspection device for inspecting the surface structure of a tire.

RELATED ART

With regard to surface defects of bodies for detection such as tires, various techniques are known for defect detection by frequency analysis of undulating waveforms in surface profile obtained by displacement sensors. Techniques using high speed Fourier transformation are generally known for such frequency analysis. In methods using such high speed Fourier transformation it is possible to remove noise in the measured data, or to extract the defect portion (determine the position of defects).

However, while it is possible to obtain the frequency of the frequency analysis result, it is difficult to determine the position thereof. In order to address this issue a technique is proposed (see, for example, Patent Document 1) in which displacement of the external surface of the tire is detected by a sensor, and a waveform is obtained by wavelet processing of this displacement signal, which is the output signal from the sensor. Tire defects are detected by comparing the obtained waveform with that of a defect waveform.

Patent Document 1 Japanese Patent Application Laid-Open No. 10-160453

DISCLOSURE OF THE INVENTION

Problem to be Solved by the Invention

However, in methods obtaining a waveform by wavelet processing every parameter must be precisely set and processed, leading to a huge processing load. These methods are therefore not applicable to tire inspections in practice, since lengthy processing time is required. In addition, although visual inspection of displacement of the tire outer surface is relatively easy in comparison to detection using a sensor, visual confirmation of the inner surfaces of tires is difficult and application thereto is problematic.

The present invention is made in consideration of the above circumstances, and an object thereof is to provide a tire inspection device capable of high precision defect detection on a tire surface within a short period of time, independent of whether it is the tire inner surface or outer surface.

Method of Solving the Problem

A first aspect of the present invention is a tire inspection device including: a storage means for storing an integer numeric filter generated from an analyzing wavelet, created for wavelet transformation correlating time, corresponding to tire surface position, and frequency, the analyzing wavelet being based on a frequency representing a characteristic portion of a predetermined tire surface structure; a detection means for detecting surface structure of a tire; a transformation means for wavelet transformation of a detection signal from the detection means using a numeric filter as an analyzing wavelet; and an output means for outputting as characteristic information the characteristic portion representing the transformation result of the transformation means.

According to the first aspect of the present invention, the integer numeric filter, generated from the analyzing wavelet created for wavelet transformation based on the frequency representing the characteristic portion of the tire surface structure, is stored in the storage means. There are tire structural materials incorporated in the tire, such as cords, belts and the like. There is rubber between such structural materials and the outer portion of the tire, however, the tire structural materials become visible from the outside when this rubber is thin or not present. Regions where these tire structural materials are visible from the outside sometimes result in tire defects. However, when tire structural materials such as cords, belts and the like are incorporated in a tire then generally this leads to a periodic undulating structure.

A region where these tire structural materials are visible from the outside is used as the characteristic portion of predetermined tire surface structure, and the frequency representing the characteristic portion is derived. An analyzing wavelet is created, based on this frequency, for wavelet transformation correlating time, corresponding to tire surface position, and frequency. A wavelet transformation mother wavelet can thereby be created, capable of extracting the characteristic portion. The analyzing wavelet is in decimal number notation, and therefore is not suitable for computation using a computer. This is because floating point operations are required. An integer numeric filter is therefore generated from this created analyzing wavelet. The numeric filter generated in this manner is stored in a storage means.

The detection means detects the tire surface structure for tire inspection. This detection is preferably detection obtaining image information. For example, detection is preferably made by inputting imaged information, such as brightness information or the like, captured by imaging a tire. Height information during profile inspection may also be input, as in a light-section method. In tire surface structure detection by inputting such image information, the information is two-dimensional information, and one-dimensional information can be obtained, for example corresponding to a scan line of the two-dimensional information. A detection signal corresponding to the tire surface structure can be made by obtaining plural scan lines in the direction orthogonal to the scan lines.

The transformation means reads the numeric filter stored in the storage means, and also uses the numeric filter as the analyzing wavelet for wavelet transformation. The transformation means carries out wavelet transformation on the detection signal of the detection means. Thereby, for example, at least a two-dimensional representation can be obtained of the relationship in a coordinate space with the time axis corresponding to the position on the tire and the frequency axis corresponding to the periodicity of the detection signal. A three-dimensional representation is also possible by adding in the signal strength. The output means thereby outputs the transformation result of the transformation means as characteristic information indicating the characteristic portion.

Since wavelet transformation is carried out here using the numeric filter from the analyzing wavelet created based on the frequency representing the characteristic portion, a transformation result can be obtained capable of, for example, specifying the characteristic portion of the tire surface structure corresponding to a region in which tire surface structure is visible from the outside. Consequently by displaying characteristic information that is the output from the output means as values corresponding to the position on the tire, and displaying a region matched with the tire profile, a region corresponding to where the tire surface structure materials are visible from the outside, the characteristic portion of tire surface structure, can be shown.

A second aspect of the present invention is a tire inspection device of the first aspect, further including a specifying means for specifying the frequency of the characteristic portion by wavelet analysis of a tire having a characteristic portion of tire surface structure, the wavelet analysis correlating the time, corresponding to the tire surface position, and the frequency, wherein the storage means is configured to store the numeric filter for the frequency specified by the specifying means. By providing the specifying means in this embodiment the frequency of the characteristic portion is specified by wavelet analysis, and the frequency can be specified by computation using wavelet analysis alone, without the need for carrying out various preliminary experiments.

A third aspect of the present invention is the tire inspection device of the first aspect further including a creating means for creating the analyzing wavelet based on the frequency representing the characteristic portion, wherein the storage means is configured to store the numeric filter from the analyzing wavelet created by the creating means. In this aspect, since the creating means creates the analyzing wavelet based on the frequency representing the characteristic portion, the analyzing wavelet is readily created for generating the numeric filter to be stored storing in the storage means.

A fourth aspect of the present invention is the tire inspection device of the first aspect further including a generating means for generating an integer numeric filter for use in wavelet transformation from an analyzing wavelet, wherein the storage means is configured to store the numeric filter generated by the generating means. In this aspect, since the numeric filter is generated by the generating means, the numeric filter can be readily generated by input of the analyzing wavelet alone.

A fifth aspect of the present invention is the tire inspection device of the first aspect, wherein the output means is configured to output as characteristic information a relationship between the time, corresponding to the position on the surface of the tire, and the frequency. In this aspect, since the relationship between the time, corresponding to the position on the surface of the tire, and the frequency is output as the characteristic information, the correspondence relationship between the position on the tire and the frequency can be readily identified.

A sixth aspect of the present invention is the tire inspection device of the first aspect, wherein the output means is configured to output as characteristic information position(s) on the surface of the tire corresponding to transformation result (s) of the transformation means exceeding a specific value. In this aspect, positions on the surface of a tire having a high probability of leading to a defect can be shown by setting the specific value to a value of transformation results corresponding to regions where the tire structural material is visible from the outside and there is a high probability of leading to a tire defect.

A seventh aspect of the present invention is the tire inspection device of the first aspect, wherein the output means is configured to include a judgment means for judging the necessity of a detailed inspection when the transformation result of the transformation means exceeds a specific value. In this aspect ready judgment can be made as to whether or not there is a tire with a high probability of leading to a tire defect since judgment is made by the judgment means as to whether the transformation result exceeds the specific value.

An eighth aspect of the present invention is the tire inspection device of the first aspect configured such that the characteristic portion of the surface structure of the tire is positioned on the inside surface of the tire. According to this invention characteristic portions of the tire surface structure can be detected on the tire inner surface.

A ninth aspect of the present invention is the tire inspection device of the first aspect configured such that the characteristic portion of the surface structure of the tire is a cord exposure portion of the tire. In this aspect, regions can be readily identified in which the tire structural materials such as cords and belts have been exposed in cases where rubber is thin or rubber is not present, by defining cord exposure portions of the tire as the characteristic portion.

A tenth aspect of the present invention is the tire inspection device of the first aspect configured such that the storage means stores as the numeric filter each of a real part and an imaginary part. In this aspect it is possible to readily carry out wavelet transformation when the analyzing wavelet is configured with a real part and an imaginary part, by storing each part.

Effect of the Invention

The tire inspection device according to the present invention explained above exhibits the excellent effect of being able to obtain, by wavelet transformation using a numeric filter from an analyzing wavelet generated on the basis of a frequency representing the characteristic portion, a transformation result that can identify, for example, a characteristic portion of tire surface structure corresponding to a region where tire structural materials are visible from the outside.

BEST MODE OF IMPLEMENTING THE INVENTION

Figure 1:
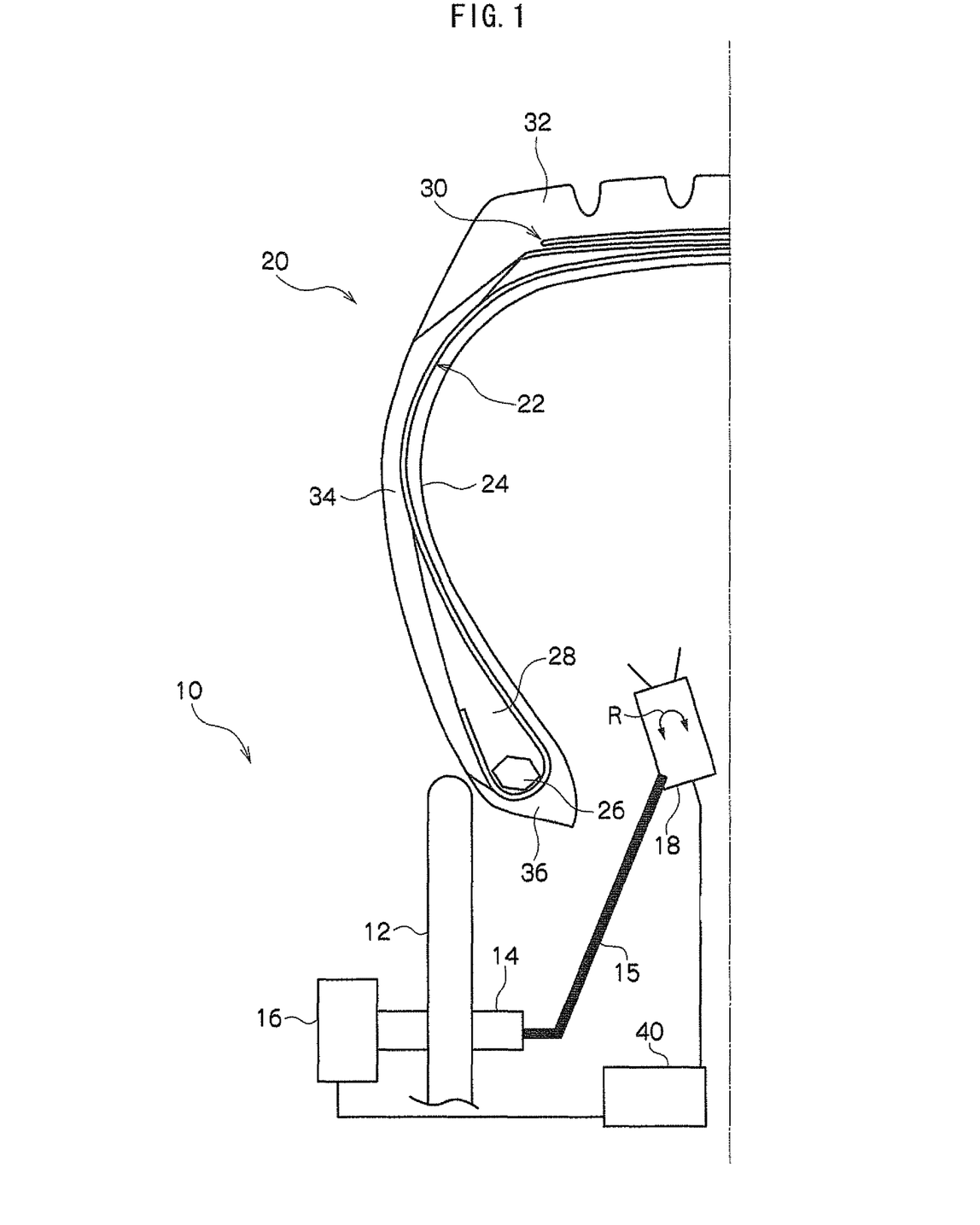
FIG. 1 is a schematic configuration diagram of a tire inspection device according to an exemplary embodiment of the present invention.

FIG. 1 shows a fitted state of a tire 20 (shown in cross-section) subjected to inspection by a tire inspection device 10 of an exemplary embodiment of the present invention. The tire inspection device 10 is provided with holders 12 for holding the tire 20. The holders 12 perform a similar role to a wheel for actual fitting of the tire 20. The holders 12 are configured with a pair of circular disk portions that are disposed facing each other and parallel to each other (only one side is shown in FIG. 1). A rotational axis holder 14 is attached at the center of one of the holders 12, the rotational axis holder 14 being connected to the rotational axis of a motor 16. The motor 16 is connected to a controller 40.

A camera 18 is attached to the rotational axis holder 14 through an arm 15, the camera 18 being connected to the controller 40. The camera 18 is disposed so as to be able to image the inside of the tire 20. The rotational axis holder 14 is configured with a bearing for enabling the holder 12 and the arm 15 to rotate relative to each other. The motor 16 is driven according to an instruction signal from an imaging position control unit 44 of the controller 40, such that the holder 12 and the arm 15 can be relatively rotated with respect to each other. The camera 18 is thus able, by this configuration, to image around the entire circumference of the tire 20.

The tire 20 is configured with a carcass 22 that partitions each of plural rubber members, with the carcass 22 folding back on itself around a bead 26. Various types of cord are contained within the carcass 22. An inner liner 24 is disposed on the inside of the carcass 22, and a bead rubber 36 is disposed extending from the inner liner 24. A substantially triangular shaped region formed by the folded-back carcass 22 is configured by a bead filler 28. A belt 30 is disposed above the carcass 22, a tread rubber 32 is disposed on the outside of the belt 30 in the radial direction, the tread rubber 32 having grooves formed therein, and a side rubber 34 is disposed on the outside in the axial direction of the carcass 22.

Figure 2:
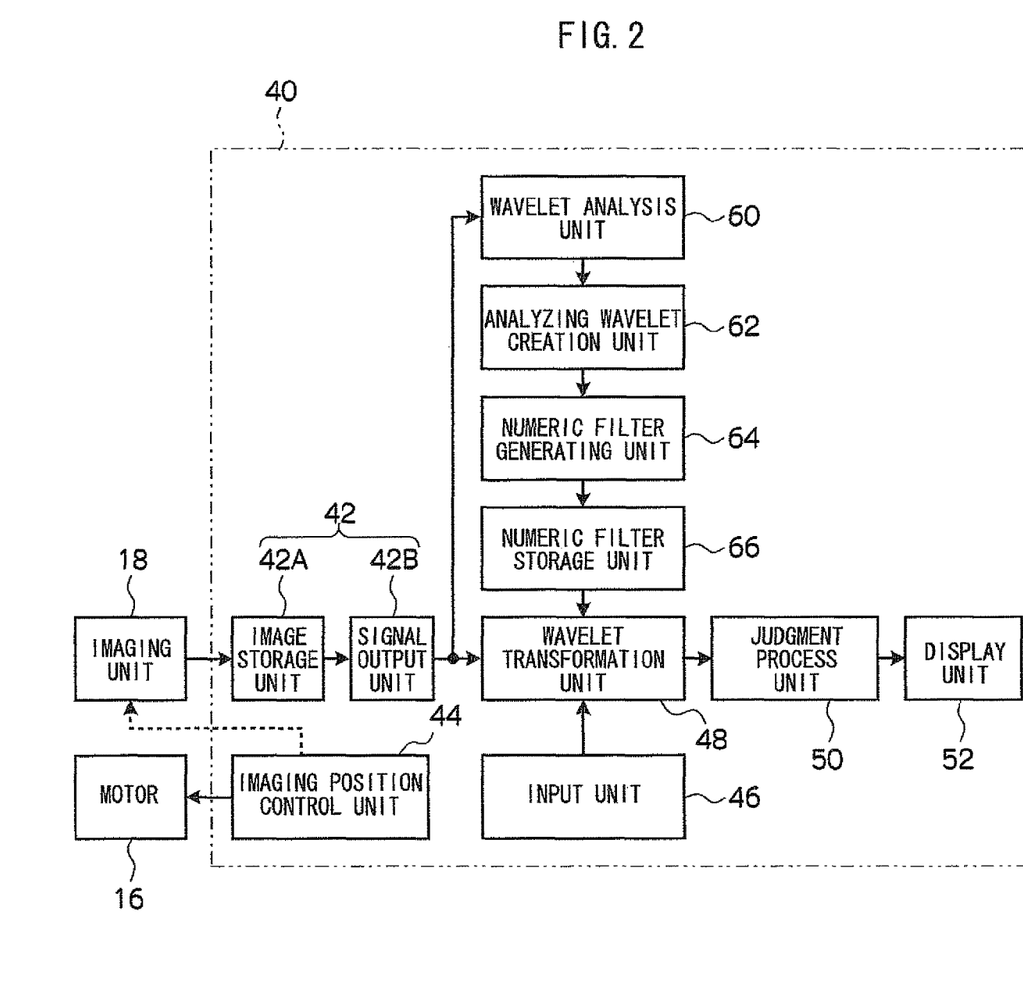
FIG. 2 is a block diagram showing a schematic configuration of a controller of a tire inspection device according to an exemplary embodiment of the present invention.

As shown in FIG. 2, the motor 16 is connected to the imaging position control unit 44 of the controller 40, and the rotational position for imaging inside the tire 20 is controlled. The controller 40 is a non-illustrated computer configuration including a CPU, ROM, and RAM, and the controller 40 of the computer configuration is shown in FIG. 2 as separate functional blocks.

A processing program for executing various processes, for later described wavelet analysis, wavelet transformation and tire inspection, is stored in the non-illustrated ROM of the controller 40. A flexible disk unit (FDU), capable of insertion with a flexible disk as a recording medium, can also be provided to the controller 40. The above processing program and the like can be read from a flexible disk using the flexible disk unit. Consequently the processing program can be recorded on a flexible disk in advance and the processing program recorded on the flexible disk may be executed through the flexible disk unit. A high capacity storage device (not shown in the figures), such as a hard disk drive or the like, may also be connected to the controller 40, so that the processing program can stored (installed) on the high capacity storage device (not shown in the figures) for execution. If an optical disk, such as a CD-ROM, DVD or the like, or a magneto-optical disk such as an MD, MO or the like, is used as a recording medium then a corresponding device may be used in place of, or in addition to, the above flexible disk unit.

The imaging position control unit 44 of the controller 40 is also connectable (shown as an intermittent line in FIG. 2) to the camera 18, serving as an imaging unit. Namely when it is possible to image the tire radial direction inside surface of the tire 20 with the camera 18 at a single time, then it is possible to image the inside of the tire 20 around the entire circumference thereof by relatively rotating the tire 20 with respect to the camera 18. However, if the imaging region of the camera 18 is limited, and it is not possible to image the tire radial direction inside surface of the tire 20 at a single time, then the imaging region needs to be moved. The camera 18 needs, for example, to be rotated within the tire 20 (rotation in the direction shown by arrow R in FIG. 1). In such cases a movement mechanism (rotation mechanism) is provided to the arm 15 or the like, for moving the imaging region, and the movement mechanism is connected to the imaging position control unit 44 of the controller 40 so as to be controllable thereby.

The camera 18, serving as an imaging unit, is connected to an image signal processing unit 42 of the controller 40. The image signal processing unit 42 is configured with an image storage unit 42A for temporarily storing images captured by the camera 18, and a signal output unit 42B for outputting an image signal one line at a time, corresponding to scan lines from the captured image stored in the image storage unit 42A. The signal output unit 42B is connected to the output side of the image signal processing unit 42 so as to input the image signal output from the signal output unit 42B into a wavelet transformation unit 48.

The wavelet transformation unit 48 is a functional unit for executing wavelet transformation processing, described in detail later, and the output side thereof is connected to a judgment process unit 50 so that the transformation result can be input thereto. An input unit 46 is also connected to the wavelet transformation unit 48, enabling input thereto of an input signal from a user, using a keyboard or the like. The judgment process unit 50 is a functional unit for defect detection processing signal processing and the like, from a transformation signal of transformation result of the wavelet transformation unit 48. The output side of the judgment process unit 50 is connected to a display unit 52 for displaying the post signal processing of the judgment process unit 50, namely for displaying computation results and the like.

A numeric filter storage unit 66 is also connected to the wavelet transformation unit 48. The numeric filter storage unit 66 is a unit for storing an analyzing wavelet (mother wavelet) used during wavelet transformation, and an integerized filter coefficient as an analyzing wavelet generated by wavelet analysis by processing of a later described routine (filter value).

In the present exemplary embodiment wavelet transformation is used for tire inspection to inspect for cord exposure defects and the like. The analyzing wavelet used for wavelet transformation is an analyzing wavelet derived in advance by wavelet analysis. The wavelet analysis and the wavelet transformation are functionally substantially the same as each other, however from the perspective of tire inspection they are explained as separate functional processes executed in the controller 40.

Namely, the output side of the image signal processing unit 42 is also connected to a wavelet analysis unit 60 so that the image signal output from the signal output unit 42B is also input thereto. The wavelet analysis unit 60 is an analyzing unit for searching the captured image of the tire 20 containing cord exposure defects and the like, for characteristic frequency of cord exposure defects and the like, and the output side of the wavelet analysis unit 60 is connected to the input side of an analyzing wavelet creation unit 62 for inputting with the results of the analysis. The analyzing wavelet creation unit 62 is a functional unit for creating an analyzing wavelet from the characteristic frequency of cord exposure defects from the analysis results of the wavelet analysis unit 60.

The output side of the analyzing wavelet creation unit 62 is connected to the input side of a numeric filter generating unit

64. The numeric filter generating unit 64 is a filter generating unit for transforming the analyzing wavelet created by the analyzing wavelet creation unit 62 into a numeric filter capable of high speed computation. The numeric filter generating unit 64 and the numeric filter storage unit 66 are connected together such that the numeric filter generated by the numeric filter generating unit 64 can be stored in the numeric filter storage unit 66. Processing from the wavelet analysis unit 60 up to the numeric filter storage unit 66 can be configured so as to be capable of off-line processing.

Wavelet Transformation

Explanation will now be given of the wavelet transformation which is the basis of the present exemplary embodiment. The wavelet transformation is transformation processing of frequency analysis to enable analysis of a signal whose characteristics change with time, enabling the detecting of localized phenomenon (impulse phenomenon). In the present exemplary embodiment the position on a tire is corresponded to time, and transfer processing is carried out so as to represent the strengths of individual wavelets when the signal is convolved with wavelets (small waves), of unique spread in a flat plane of time (tire position) and frequency on the coordinate axes. Namely, the processing is scaling and translating of wavelets, such that the combined wavelets represent the input signal.

Specifically, the wavelet transformation is as defined by the following equation.

$$\tilde{f}(a, b) = \frac{1}{\sqrt{|a|}} \int_{-\infty}^{+\infty} f(t) \overline{\psi\left(\frac{t-b}{a}\right)} dt \quad \text{Equation 1}$$

$f(t)$: source signal $\psi(t)$: analyzing wavelet

Wherein:

$$\int_{-\infty}^{\infty} \psi(t) dt = 0 \text{ satisfying admissible condition (average = 0)}$$

In the above a and b are real numbers. Real number a is a parameter (scale parameter) for determining the scaling ratio of the analyzing wavelet in the time direction, and corresponds to the frequency. Real number b is a parameter (translation parameter) corresponding to the time translation amount, for determining the window position, namely the analysis period. Consequently the wavelet transformation is for convolution operation using source signal f and real numbers a and b as the respective parameters relating to scaling and translation in the analyzing wavelet (function).

The analyzing wavelet of the above Equation is defined by the following Equation. Explanation will be given of the present exemplary embodiment in which a Gabor function is used as the basis function. It should be noted that base functions for wavelet transformation are not limited to Gabor functions, and other functions, such as Mexican hat, French hat, and Meyer functions, may also be used.

$$\omega(t) = h(t) e^{j\omega_o t} \quad \text{Equation 2}$$

Wherein, h(t): Gabor function

When the parameter expression is added with real numbers a and b, representation as an equation is possible.

$$\psi_{a,b}(t) = \frac{1}{\sqrt{|a|}} \psi\left(\frac{t-b}{a}\right) \quad \text{Equation 3}$$

$$= \frac{1}{\sqrt{|a|}} \exp\left(-\frac{(t-b)^2}{4\sigma^2 a^2}\right) \exp\left(j\omega_o \frac{t-b}{a}\right)$$

Up to the second exponential function term in the above equation corresponds to a Gabor function. The second exponential function term corresponds to a trigonometric functions of angular frequency $\omega_0/a$ by Euler formula. An analyzing wavelet defined in such a manner, and wavelet transformation can be represented by the following equation.

$$\tilde{f}(a, b) = \int_{-\infty}^{+\infty} f(t) \frac{1}{\sqrt{|a|}} \exp\left(-\frac{(t-b)^2}{4\sigma^2 a^2}\right) \exp\left(j\omega_o \frac{t-b}{a}\right) dt \quad \text{Equation 4}$$

Figure 3A:
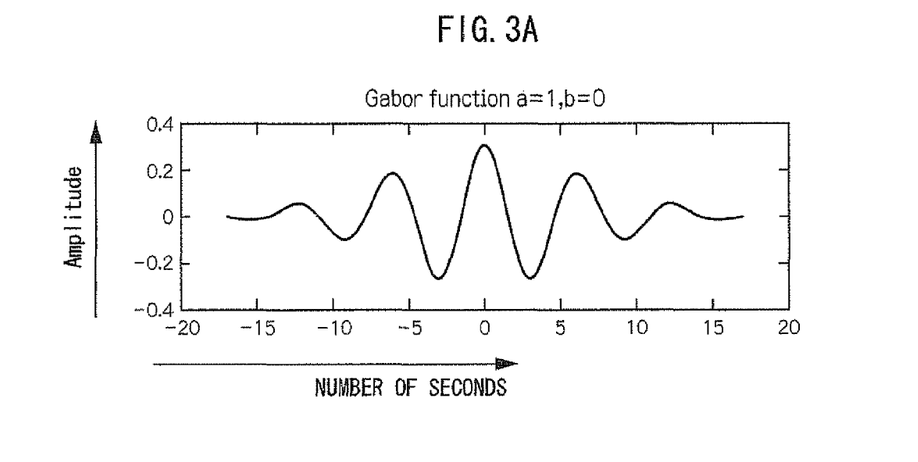
FIG. 3A is an explanatory diagram of a window function, a Gabor function image.
Figure 3B:
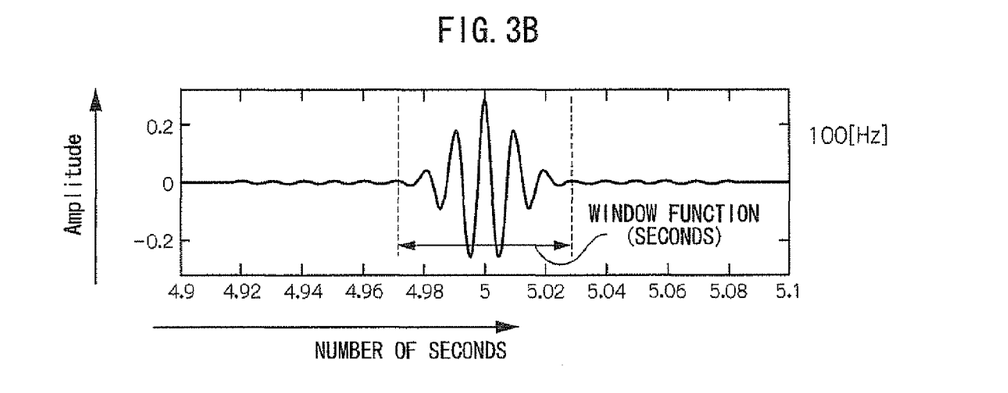
FIG. 3B is an explanatory diagram of a window function, an image of a window function under specific conditions.
Figure 3C:
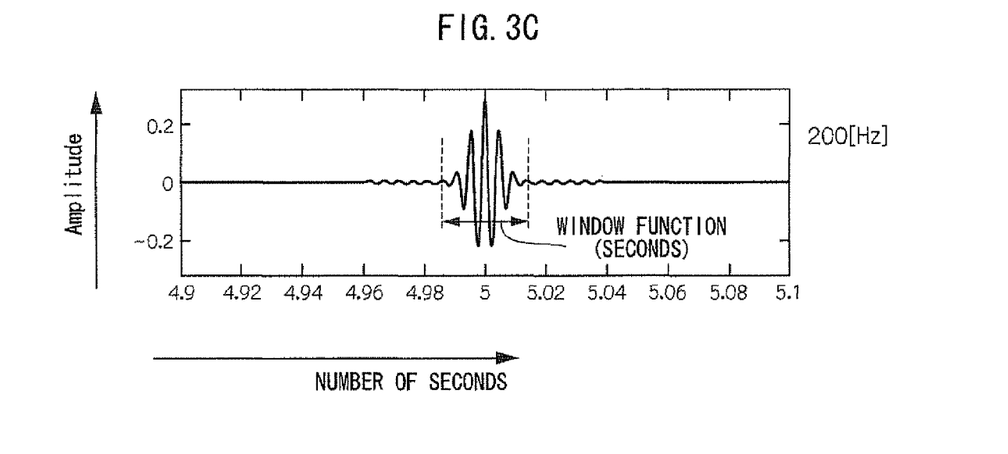
FIG. 3C is an explanatory diagram of a window function, an image of a window function under other conditions.

From after the source signal function term up to the first exponential function in this equation corresponds to the window function. Specific examples of such a window function are shown in FIGS. 3A to 3C. FIG. 3A shows a Gabor function with real number a=1, and real number b=0. FIG. 3B shows an image with real number a=100 and real number b=5, namely a window function at 5 seconds at 100 Hz. FIG. 3C shows an image with real number a=200 and real number b=5, namely a window function of 5 seconds at 200 Hz.

It should be noted that the analyzing wavelet using a Gabor function is a complex function, and the complex function can be represented split into a real part and an imaginary part. In the present exemplary embodiment the analyzing wavelet is used when split into a real part and an imaginary part, in order to suppress the computational load. The next equation shows a generalized analyzing wavelet in separated notation.

$$u(a,b) + i \cdot v(a,b)$$

In this equation u( ) is the real part and v( ) is the imaginary part.

Explanation will now be given of the operation of the present exemplary embodiment, using the above described wavelet transformation. Explanation will be given of the present exemplary embodiment in a ease of detection of defects due to exposure of cords of a carcass through the thin rubber at the inside surface of a tire.

The operation of the tire inspection device 10 of the present exemplary embodiment can be broadly divided into numeric filter generation processing by wavelet analysis, and defect detection processing by wavelet transformation. The numeric filter generation processing by wavelet analysis is configured with a first process of wavelet analysis of a defect portion to investigate the characteristic frequency of cord exposure defects, a second process of specifying the frequency of the defect portion (specifying the frequency for creating the analyzing wavelet), a third process for creating an analyzing wavelet, and a fourth process for generating a numeric filter for use in high speed image processing (transforming the analyzing wavelet into a numeric filter as a filter for use in high speed image processing). Defect detection processing by wavelet transformation is detection processing of the cord exposure portion using the generated numeric filter.

Filter Generation

Figure 4:
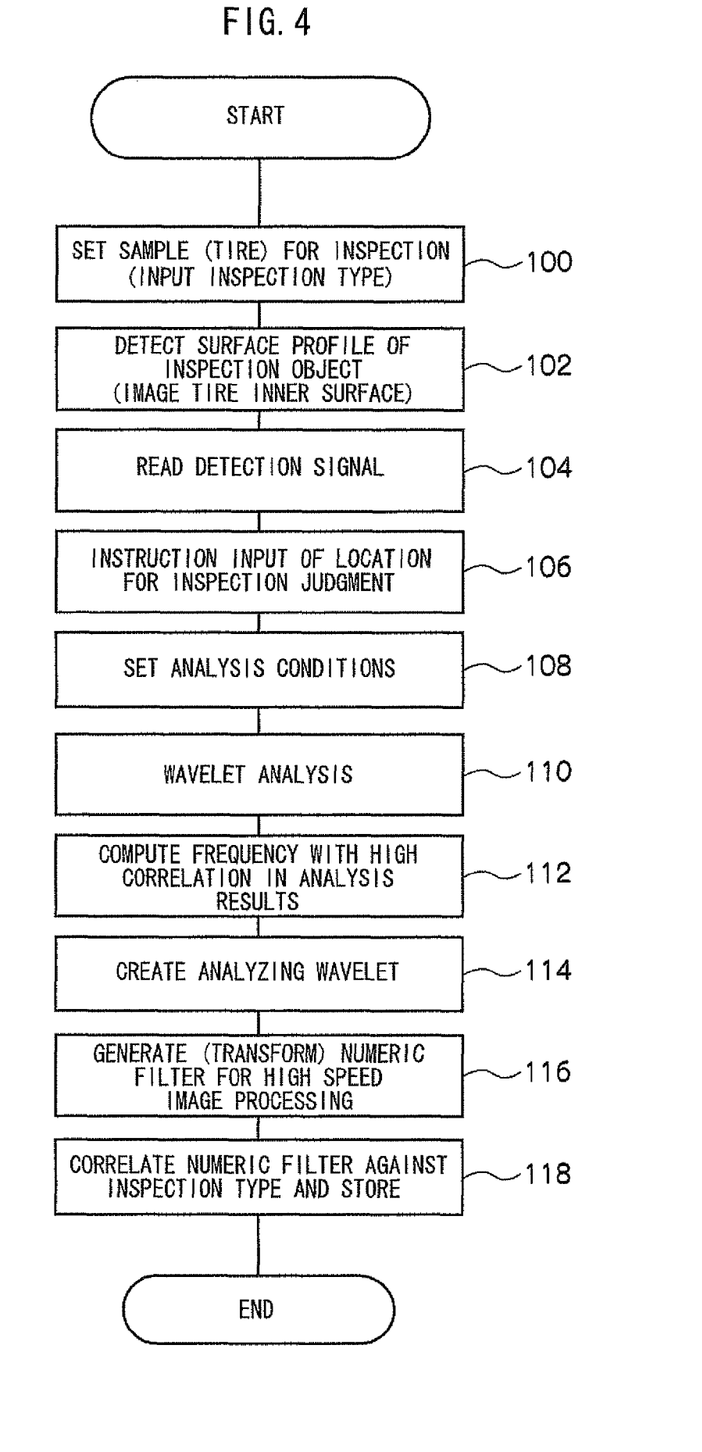
FIG. 4 is a flow chart showing a processing flow for generating a numeric filter by wavelet analysis.

In numeric filter generation processing by wavelet analysis a processing routine shown in FIG. 4 is executed by the controller 40. First the tire 20, with exposed cords of a carcass through the thin rubber of the inside surface of the tire, is set in the tire inspection device 10, and the image capture position is set so that the region in which the cords have been exposed is included within the image capture range of the camera 18. The power to the controller 40 is switched on, and when an instruction to start the numeric filter generation processing routine is input by the input unit 46, the processing routine of FIG. 4 is executed. At step 100, a user's instruction is read from the input unit 46, and input is made of the type of inspection corresponding to the input value. In this case carcass cord exposure is the type of inspection input.

Figure 5:
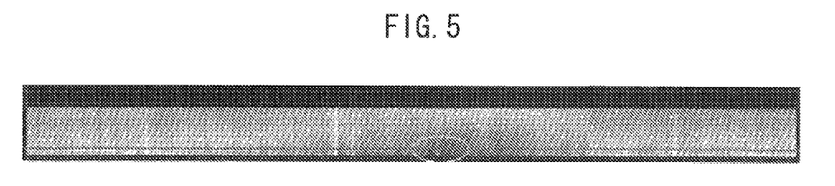
FIG. 5 is an image showing a captured image of a tire inner surface.
Figure 6:
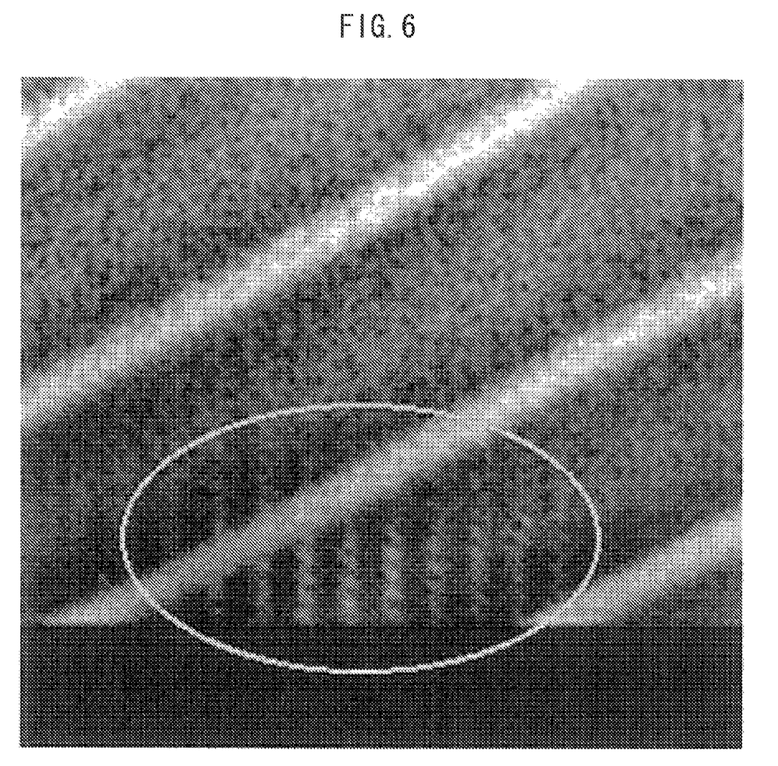
FIG. 6 is an expanded view of a portion of FIG. 5.

At the next step 102 the inner surface of the tire 20 is imaged with the camera 18, and at the next step 104 this captured image signal is read by the image signal processing unit 42. At the next step 106, an input instruction of the location for use in inspection determination in the captured image is read by the input unit 46. FIG. 5 shows a captured image of the inner surface of a tire having ridges, with a cord exposed portion at a middle portion (the circled region in FIG. 5). The longitudinal direction in FIG. 5 is the tire width direction, and the direction orthogonal to the longitudinal direction corresponds to the tire circumferential direction. FIG. 6 shows an expanded view of the bulging portion of FIG. 5, the cord exposure portion. The input instruction of the location for use in inspection determination may be by displaying the image and reading a region designated on the image, or the position in the tire width direction and orthogonal direction thereto can be corresponded against time, and a time period may be designated. The cord exposure portion, which is the defect portion, can thereby be designated on the captured image (in the detected signal)

At the next step 108 the analyzing conditions are set. This setting may be by setting input value(s) with the input unit 46, or by reading out setting value(s) stored in advance. The analyzing conditions are setting the setting values of $\omega_0$ and $\sigma$ of the analyzing wavelet, and the analyzing frequency. Explanation will be given here of an example in which the analyzing conditions are set with $\omega_0=2.0$, $\sigma=2.0$, and with analyzing frequencies from 20 to 100 Hz.

Figure 7A:
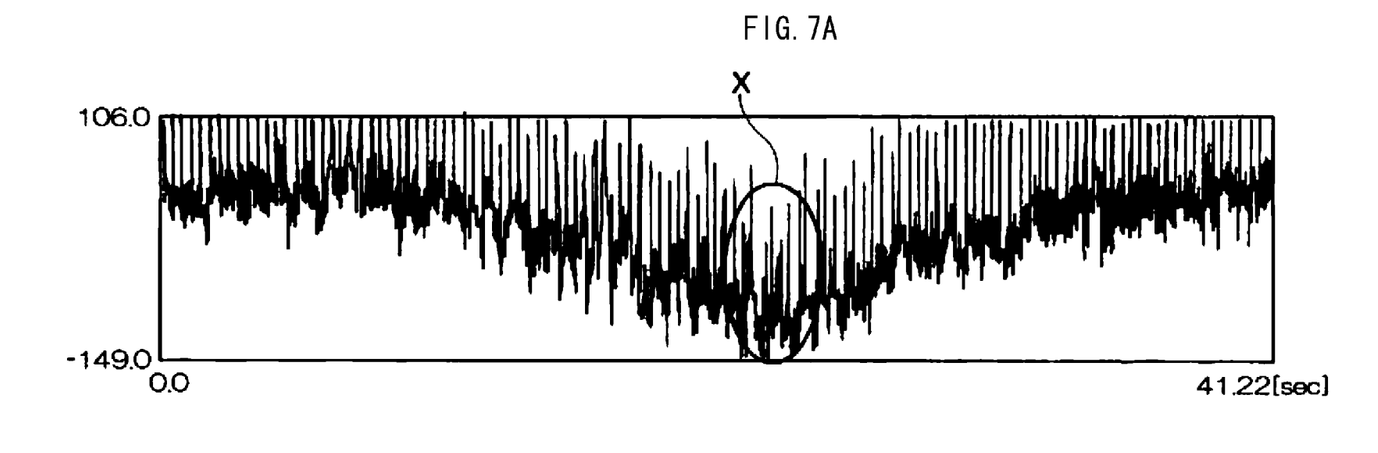
FIG. 7A is a chart showing an image capture signal that is the source signal of a captured image.
Figure 7B:
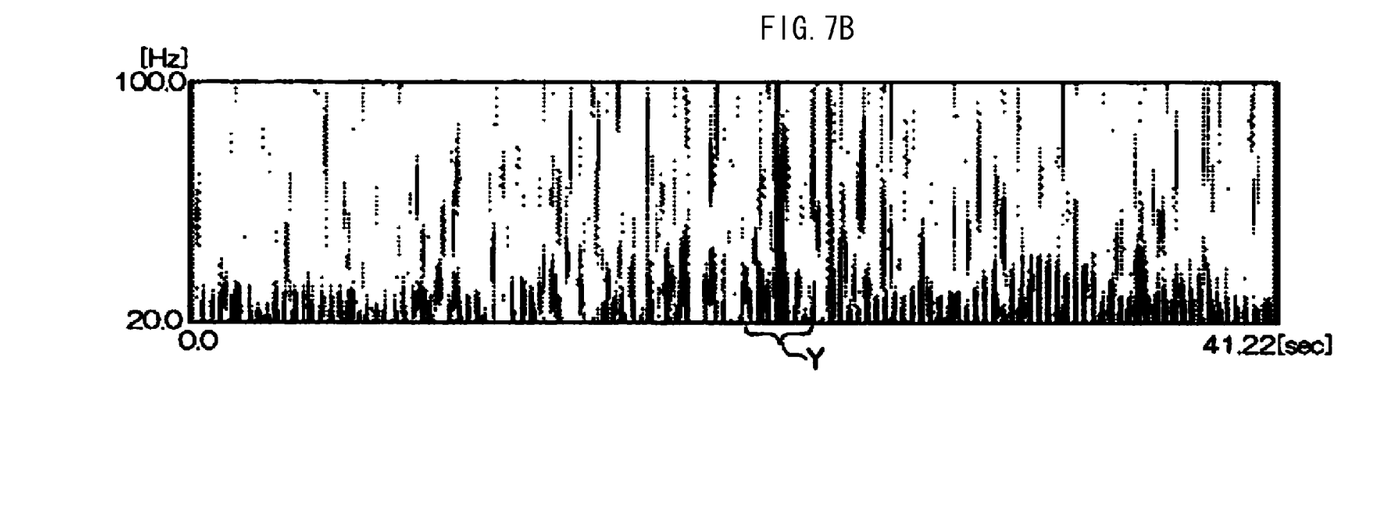
FIG. 7B is a chart showing wavelet analysis results.

At the next step 110 wavelet analysis is executed according to the analyzing conditions on the image signal as the source signal f, and at the next step 112 the frequency with the maximum correlation in the analysis results is determined for the central frequency. This analysis is executed in the wavelet analysis unit 60. FIG. 7A shows an image signal that is the source signal of the captured image shown in FIG. 5, and FIG. 7B shows wavelet analysis results. It should be noted that one line of captured image signal is shown here, corresponding to a scan line of the captured image. A coordinate space is shown in FIG. 7A, with coordinate axes of time, corresponding to tire position shown on the horizontal axis, and signal strength shown on the vertical axis. A coordinate space is shown in FIG. 7B, with coordinate axes of time (tire position) shown on the horizontal axis, and frequency shown on the vertical axis. A region X is the source signal f region corresponding to the cord exposure portion shown in FIG. 5 and FIG. 6, and a region Y is the analysis results. The wavelet analysis at step 110 is the first process of wavelet analysis of the defect portion to investigate the characteristic frequency of cord exposure defects, and the computation of frequency of step 112 is the second process of specifying the frequency of the defect portion (specifying the frequency for creating the analyzing wavelet).

Figure 8:
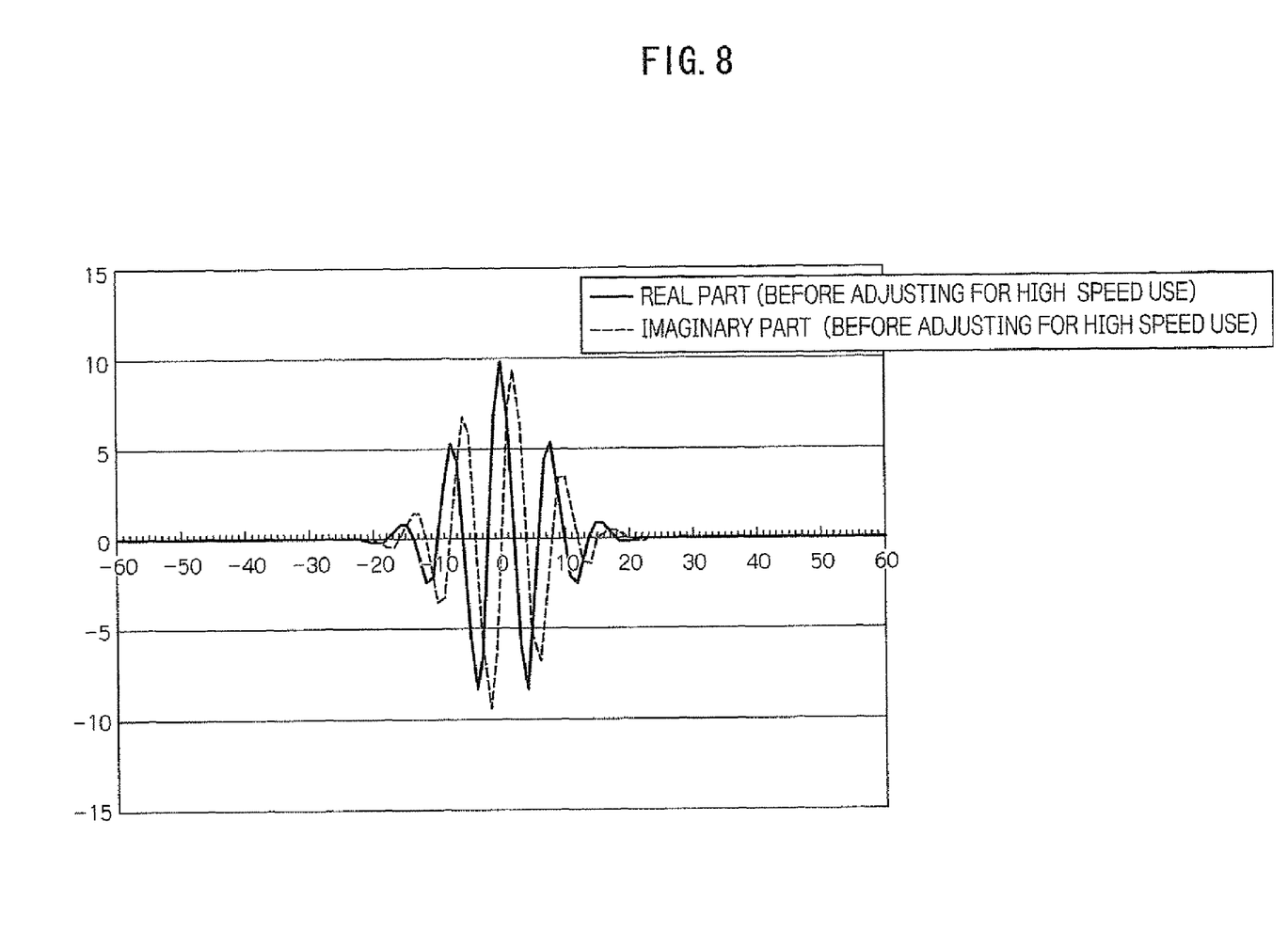
FIG. 8 is a graph showing an analyzing wavelet.

At the next step 114 an analyzing wavelet is created. This processing is executed in the analyzing wavelet creation unit 62. Namely, since the characteristic frequency of the cord exposure defects is derived in the above step 112, the analyzing wavelet can be created using this frequency. It should be noted that in the present exemplary embodiment a Gabor function is used, and so a real part and an imaginary part of the analyzing wavelet is created. FIG. 8 shows the created analyzing wavelet. Step 114 corresponds to the third process of creating the analyzing wavelet.

At the next step 116, a numeric filter is generated for high speed image processing. This generation processing is executed in the numeric filter generating unit 64. The analyzing wavelet, as shown in FIG. 8, is a decimally notated number and is unsuitable for calculating with a computer. Namely, since floating-point notation is required for wavelet transformation that has used a decimally notated number-analyzing wavelet, the computational load is immense. In order to address this issue, at step 116 an integer numeric filter is generated from the created analyzing wavelet.

Figure 9:
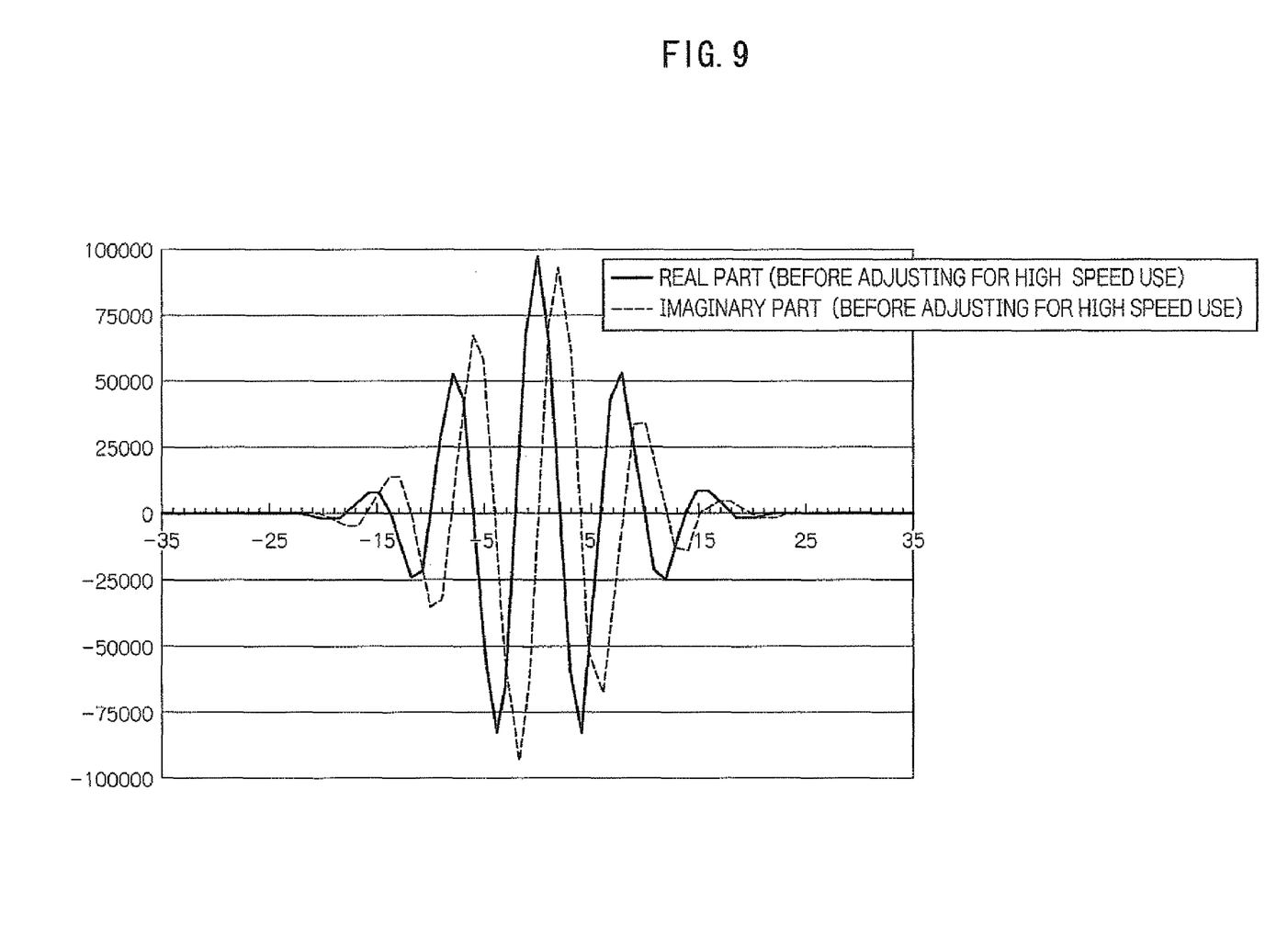
FIG. 9 is a graph showing a numeric filter.

In the present exemplary embodiment the numeric filter is generated by multiplying the analyzing wavelet by a specific multiplier (for example 10000 times) and then discarding any digits after the decimal point. In addition portions of the analyzing wavelet that exceed a specific time interval from the analyzing wavelet center (time 0) are allocated a value "0", This is in order to use the wavelet within a specific region from the analyzing wavelet center (time 0). By so doing an analyzing wavelet can be made into an integer, and taps of imperceptible movement can be eliminated. Consequently the load of multiply and accumulate operations can be suppressed during wavelet transformation, and high speed computation can be achieved. This step 116 corresponds to the fourth process of wavelet analysis for generating a numeric filter for use in high speed image processing (transforming the analyzing wavelet into a numeric filter as a filter for use in high speed image processing). A numeric filter as a filter for high speed image processing is shown is FIG. 9.

Next the numeric filter generated in the above manner is correlated to the type of inspection designated in above step 100, and stored in the numeric filter storage unit 66, completing the current routine.

Defect Inspection

Explanation will now be given of processing of the tire inspection device 10 for inspection of defects due to cord exposure at the tire inner surface of the tire 20. This processing is defect inspection processing by wavelet transformation, and the processing for inspection of cord exposure portion(s) uses the numeric filter generated by the processing routine shown in FIG. 4.

Figure 10:
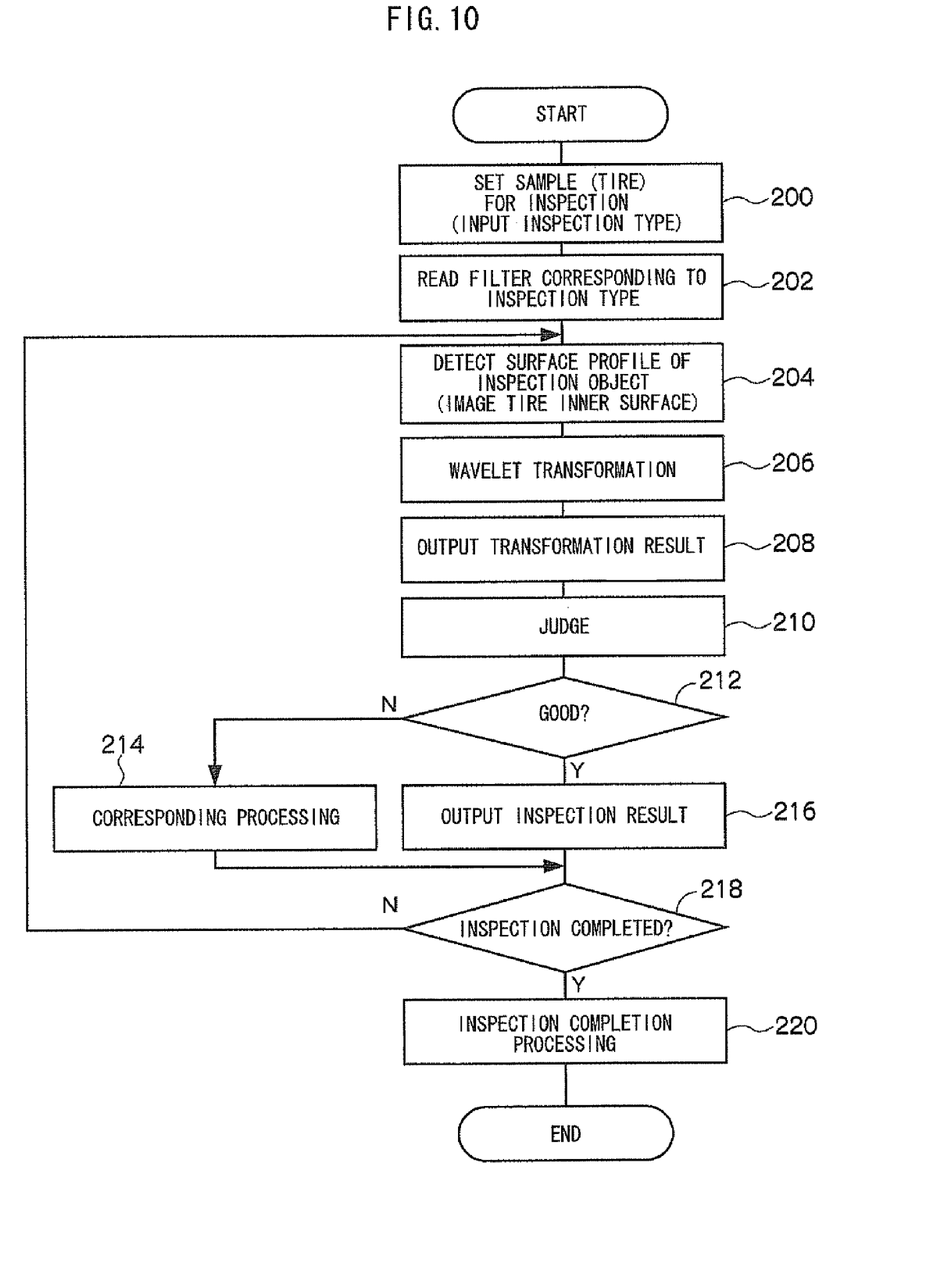
FIG. 10 is a flow chart showing a processing flow for defect detection by wavelet transformation according to an exemplary embodiment of the present invention.

The processing routine shown in FIG. 10 is executed in the controller 40 for the defect inspection processing by wavelet transformation. First the tire 20 is set in the tire inspection device 10 and the image capture range of the camera 18 is set on the tire inner surface. Power is switched on to the controller 40, and the processing routine of FIG. 10 is executed when instruction to start the defect inspection processing routine is given by the input unit 46. At step 200 the user instruction from the input unit 46 is read, and the type of inspection corresponding to this input value is input. In this case the type of inspection input is carcass cord exposure.

At the next step 202, the numeric filter corresponding to the type of inspection input in the above step 200 is read from the numeric filter storage unit 66 and the analyzing wavelet (mother wavelet) for wavelet transformation is set. At the next step 204, the inner surface of the tire 20 is imaged by the camera 18, and detection of the surface structure of the tire 20 is made by the image signal processing unit 42 reading the signal of this image.

At the next step 206 wavelet transformation is executed using the above numeric filter with the image capture signal as the source signal f, and the transformation result is output at the next step 208. This wavelet transformation is executed in the wavelet transformation unit 48. Since this wavelet transformation is wavelet analysis undertaken using an analyzing wavelet that is the numeric filter with a central frequency of the characteristic frequency of the cord exposure defects, this transformation result enables output of the values (signal) including at least the region corresponding to the cord exposure portion.

At the next step 210 the cord exposure defect judgment processing is executed based on the transformation result. This judgment processing is executed in the judgment process unit 50. Note that configuration is made such that the signal of the transformation result from the wavelet transformation unit 48 is input to the judgment process unit 50. Configuration is also made such that a threshold value from the input unit 46 can be input to the judgment process unit 50. This threshold value is a reference value (or reference range) for discriminating whether the signal of the transformation result is a cord exposure defect or cord exposure within a permissible range. The cord exposure defect detection sensitivity can be adjusted by adjusting this threshold value.

The judgment process unit 50 can include carrying out cord exposure defect judgment on a single line of the source signal f corresponding to a scan line, and image processing to derive the cord exposure defect region from the judgment results by each line. Cord exposure defect judgment may also be carried out according to the size of this cord exposure defect region. Namely, a surface area may be entered for the threshold value, and regions of area of this surface area or above may be judged to be cord exposure defect regions.

At the next step 212, determination is made from the judgment result of step 210 as to whether or not, from the captured image, the tire inner surface is a good surface without cord exposure defects. This determination is one that depends on the result of the cord exposure defect judgment. If step 212 is determined in the negative then the routine proceeds to step 214, and corresponding processing is undertaken. An example of such corresponding processing is instructing image display to a user, informing the user that detailed inspection is required because there is a cord exposure defect portion present. Another example is simply instructing display to a user that there is a cord exposure defect portion. This instruction preferably explicitly indicates the region of the cord exposure defect portion in the captured image. However, if the determination is positive at step 212, then a detection result indicating a good state is output at step 216, and the routine proceeds to step 218.

Determination is made at step 218 as to whether or not inspection has been completed of the tire inner surface for one complete relative revolution of the camera 18 with respect to the holder 12 by the imaging position control unit 44 rotating the motor 16. When the determination is negative the motor 16 is rotated by the imaging position control unit 44 in order to image the adjacent tire inner surface, the routine returns to step 204, and the above processing is repeated. However, if the determination is positive, the routine proceeds to step 220. The current routine is completed after inspection completion processing has been executed, indicating the ended tire inspection.

In this manner, in the present exemplary embodiment, inspection that would be difficult to carry out with the naked eye can be made of the inner surface of the tire 20, since cord exposure defects can be detected by wavelet transformation of the tire inner surface using as an analyzing wavelet a numeric filter, of which central frequency is a characteristic frequency of cord exposure defect by wavelet analysis. A reduction in the computational load of the processing can be achieved, since wavelet transformation is executed using a numeric filter by changing the decimally notated analyzing wavelet into an integer. Tire inspection can consequently be carried out in a comparatively short period of time and with simple operation.

It should be noted that while explanation has been given of wavelet transformation with the image signal captured by the camera 18 as the source signal the present invention is not limited thereto. For example a source signal may be used of a signal from irradiating slit shaped light and using a light-section method to measure differences in level.

In the present exemplary embodiment explanation has also been given of inspection that would be difficult to carry out with the naked eye of the inner surface of the tire 20 as the tire inspection, however, there is no limitation to the internal surface of a tire, and there is applicability to inspection and the external face of a tire and appearance checks. In addition, while explanation has been given of a case of cord exposure defect inspection in the present exemplary embodiment, the present invention is not limited thereto, and the present invention is applicable to structural inspections, such as inspections of trimming and bridging of ridges.

Working Examples

Explanation will now be given of a working example of the present invention. The present working example is a case where the tire inspection device 10 of the above exemplary embodiment is operated, and experimentation is carried out into the results of defect detection processing by wavelet transformation and the frequency specification when generating the numeric filter by wavelet analysis. Analysis by wavelet analysis was first carried out. The results are shown in the following table.

When the portion with the greatest characteristics in the frequency analysis was detected for the cord exposure portion then this is indicated with a circle in the detection column in Table 1. The frequency derived by analysis is also shown. It can be seen that a good numeric filter for detection can be generated for detecting cord exposure defects if an analyzing wavelet is created having a central frequency of about 30 Hz, as seen in this table.

TABLE 1

Wavelet Analysis Results

| | Detection | Frequency of cord exposure portion in Hz |
|---|---|---|
| Tire A | ○ | 30.8 |
| Tire B | ○ | 26.0 |
| Tire C | ○ | 27.2 |
| Tire D | ○ | 29.6 |
| Tire E | ○ | 31.2 |
| Tire F | ○ | 26.6 |
| Tire G | ○ | 31.2 |
| Tire H | ○ | 30.6 |
| Average | | 29.2 |

The results of wavelet transformation by setting the central frequency at 30 Hz and creating an integerized analyzing wavelet is shown in the following Table 2. It can be seen that the computation time can be greatly reduced by reducing the tap number by discarding minute values and eliminating floating point operations, as seen in this table.

TABLE 2

|  | Taps | Computation Time |
|---|---|---|
| Analyzing Wavelet | 121 | 91.3 seconds |
| Numeric Filter | 71 | 20.3 seconds |

Figure 11:
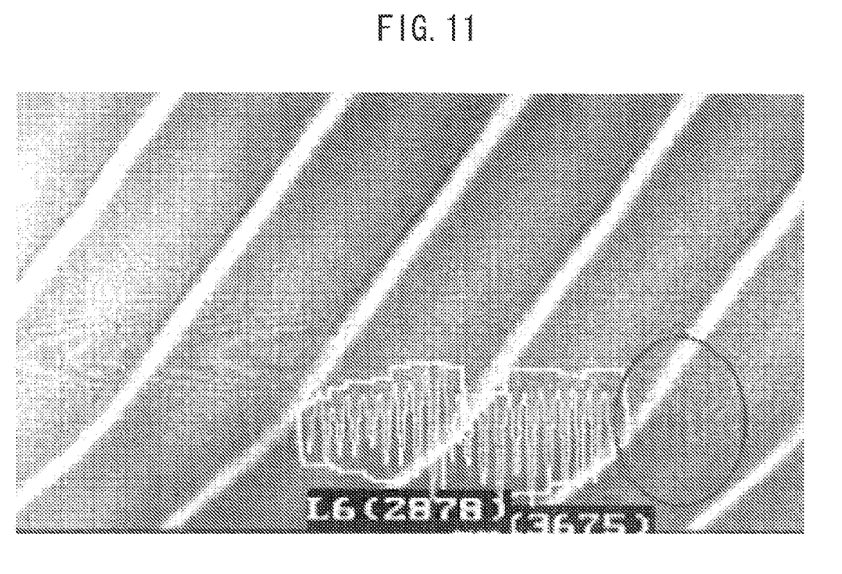
FIG. 11 is an image showing a cord exposure defect detection image obtained by conventional Fourier transformation.
Figure 12:
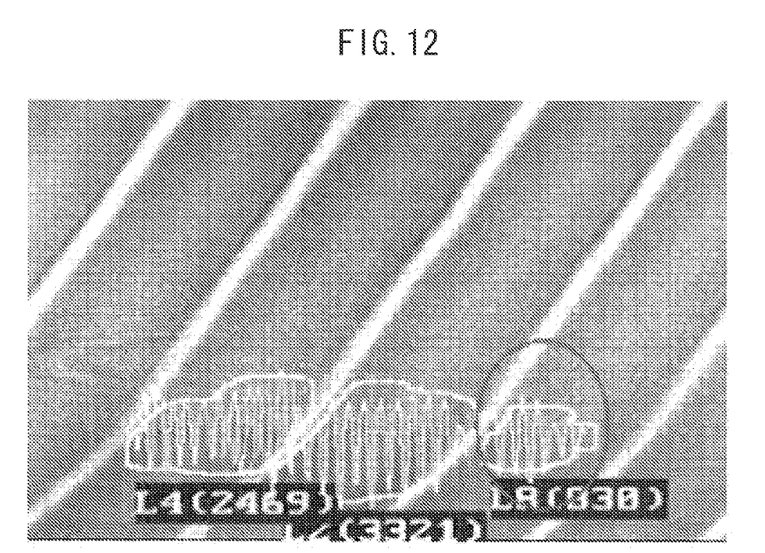
FIG. 12 is an image showing a cord exposure defect detection image obtained by wavelet transformation applying the present invention.

An image by cord exposure defect detection using a conventional Fourier transformation for cord exposure defect is shown in FIG. 11, and an image of the results of cord exposure defect detection using wavelet transformation of the above exemplary embodiment is shown in FIG. 12. It can be seen that good detection judgment can be made, even for portions where it is difficult to discriminate defects in by visual inspection, if cord exposure defect detection is carried out using the wavelet transformation of the above exemplary embodiment, as seen in these images.

EXPLANATION OF THE REFERENCE NUMERALS 10 tire inspection device
18 camera
20 tire
22 carcass
40 controller
42 image signal processing unit
46 input unit
48 wavelet transformation unit
50 judgment process unit
52 display unit
60 wavelet analysis unit
62 analyzing wavelet creation unit
64 numeric filter generating unit
66 numeric filter storage unit

The invention claimed is:

1. A tire inspection device comprising:
a generating means that generates an integer numeric filter by changing a decimally notated analyzing wavelet into an integer, the decimally notated analyzing wavelet correlating time, corresponding to a tire surface position, and frequency,
wherein the decimally notated analyzing wavelet is based on a frequency representing a characteristic portion of a predetermined tire surface structure,
a storage means for storing the integer numeric filter;
a detection means disposed so as to detect a surface structure on an inside of a tire;
a transformation means for wavelet transformation of a detection signal from the detection means using the integer numeric filter as an analyzing wavelet; and
an output means for outputting, as characteristic information, the characteristic portion representing a transformation result of the transformation means.

2. The tire inspection device of claim 1, further comprising a specifying means for specifying the frequency of the characteristic portion by wavelet analysis of a tire having a characteristic portion of tire surface structure, the wavelet analysis correlating the time, corresponding to the tire surface position, and the frequency, wherein the storage means is configured to store the integer numeric filter for the frequency of the characteristic portion specified by the specifying means.

3. The tire inspection device of claim 1, further comprising a creating means for creating the analyzing wavelet based on the frequency representing the characteristic portion, wherein the storage means is configured to store the integer numeric filter from the analyzing wavelet created by the creating means.

4. The tire inspection device of claim 1, further comprising a generating means for generating an integer numeric filter for use in wavelet transformation from the analyzing wavelet, wherein the storage means is configured to store the integer numeric filter generated by the generating means.

5. The tire inspection device of claim 1, wherein the output means is configured to output as characteristic information a relationship between the time corresponding to the position on the surface of the tire and the frequency.

6. The tire inspection device of claim 1, wherein the output means is configured to output as characteristic information position(s) on the surface of the tire corresponding to transformation result(s) of the transformation means exceeding a specific value.

7. The tire inspection device of claim 1, wherein the output means is configured to comprise a judgment means for judging the necessity of a detailed inspection when the transformation result of the transformation means exceeds a specific value.

8. The tire inspection device of claim 1, wherein the characteristic portion of the surface structure of the tire is a cord exposure portion of the tire.

9. The tire inspection device of claim 1, wherein the storage means is configured to store, as the integer numeric filter, each of a real part and an imaginary part of a complex function of the analyzing wavelet.

10. The tire inspection device of claim 2, wherein the wavelet analysis includes determining the frequency of the characteristic portion with the maximum correlation in the analysis results for a central frequency.

11. The tire inspection device of claim 2, wherein the wavelet transformation is executed by using a wavelet that is the numeric integer filter in which a central frequency is the characteristic frequency of the cord exposure defects by the wavelet analysis.

12. The tire inspection device of claim 1, wherein a real part and an imaginary part of the analyzing wavelet is created by using a Gabor function.

\* \* \* \* \*